No. 646,091. Patented Mar. 27, 1900.
R. A. HAMMOND.
ROPE THIMBLE.
(Application filed May 1, 1899.)
(No Model.)
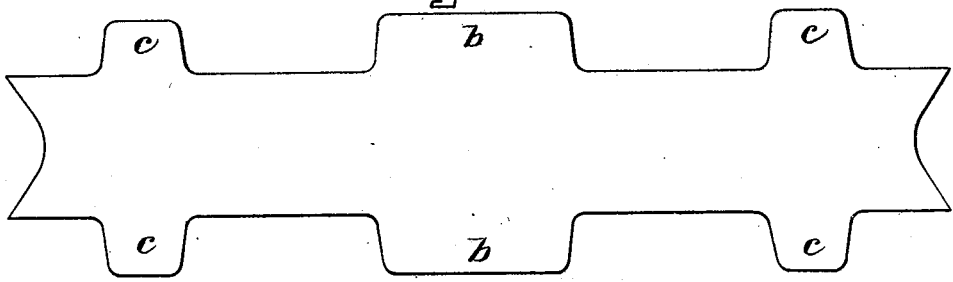
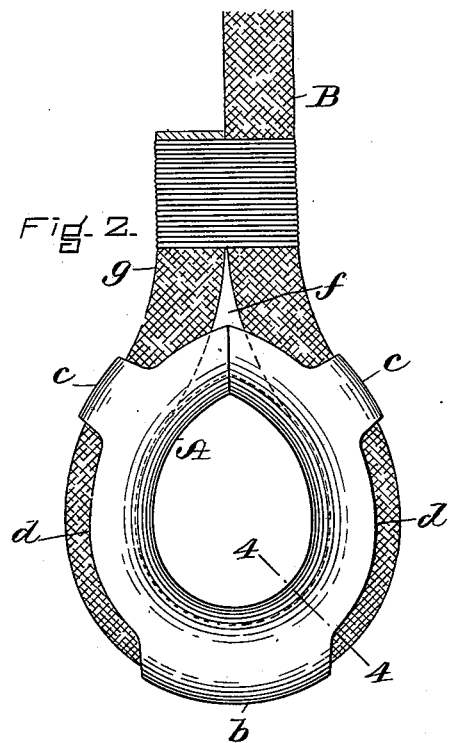 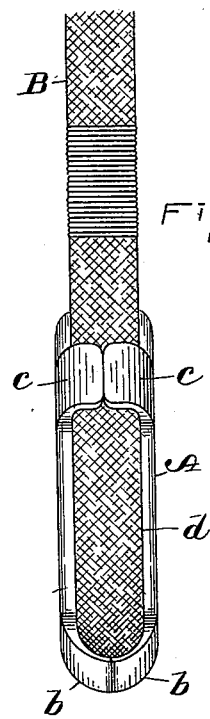
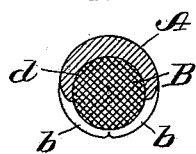
WITNESSES
A. D. Grover
M. B. Wilson
INVENTOR
Robert A. Hammond
by P. E. Teschemacher
Atty.

UNITED STATES PATENT OFFICE.

ROBERT A. HAMMOND, OF SANDWICH, MASSACHUSETTS.

ROPE-THIMBLE.

SPECIFICATION forming part of Letters Patent No. 646,091, dated March 27, 1900.

Application filed May 1, 1899. Serial No. 715,238. (No model.)

*To all whom it may concern:*

Be it known that I, ROBERT A. HAMMOND, a citizen of the United States, residing at Sandwich, in the county of Barnstable and State of Massachusetts, have invented an Improvement in Rope-Thimbles, of which the following is a specification.

The ordinary metallic rope-thimble, consisting of an externally-grooved ring which is used in forming an eye at the end of a rope, is defective for the reason that the rope is liable under some conditions to slip out of the groove owing to the V-shaped opening between the two portions of the rope directly above the thimble.

To overcome this difficulty is one object of my invention.

A further object is to protect the bend of the rope, so that where a hook is hung on the thimble its eye cannot wear or fray the rope.

These objects I attain by the construction shown in the accompanying drawings, in which—

Figure 1 is a plan of the metallic strip or blank from which my improved rope-thimble is formed. Fig. 2 is a front elevation of a rope-eye made with my improved rope-thimble. Fig. 3 is a side elevation of the same. Fig. 4 is a section on the line 4 4 of Fig. 2.

In the said drawings, A represents my improved thimble, which is made from a blank consisting of a flat strip of sheet metal of the form shown in Fig. 1. This blank, which is preferably formed by punching it out with suitable dies, is provided on opposite sides, at the center, and near each end with ears or clips $b\ c$ and is doubled longitudinally to form the external channel or groove $d$ for the rope, after which it is bent around into the form of a ring, as shown in Fig. 2, which brings the clips $b$ at the bottom and the clips $c\ c$ at the top on each side of the opening $f$, where the two ends of the ring are brought together, said clips then projecting outwardly from the edges of the channel $d$.

In forming an eye the rope B is looped and laid, as usual, within the groove or channel $d$ of the thimble, its end $g$ being secured above the thimble to the main or standing portion in the usual manner by any suitable fastening device. After the rope has been secured around the thimble the ears or clips $b$ at the bottom of the ring and those ($c$) at the top are bent inward and clenched down upon that portion of the circumference of the rope which lies outside the groove, the clips thus embracing the rope and holding it securely in place within the groove of the thimble in such manner that it cannot slip or be forced out of the same by any strain to which it would ever be subjected, the liability of accident from this cause being thus entirely avoided. The clips $b\ c$ furthermore form guards to protect the rope from contact with a pulley-block or other object, thereby avoiding injury or wear from this cause.

It will be noticed that my thimble is closed at its top where its arched ends contact and that the clips $c\ c$ are at opposite sides of the top and completely encircle the rope-eye at these points, so that the arched form of the thimble offers the maximum resistance to any crushing force and prevents the rope from being pulled out of the clips or lips $c\ c$, as would be the tendency if the upper end of the thimble were open and should be drawn into the top of a pulley-block, where the force would tend to close such open end, and thus force the clips off of the rope. Furthermore, it will be seen that the clips or lips $b\ b$ completely encircle the rope at its bend, so that a hook-eye cannot cut into and fray the rope at such point.

Although I have shown three sets of clips formed at the top and bottom of the thimble, it will be obvious that their number may be varied and that they may be located in any other desired positions around the thimble as may be found desirable or convenient.

What I claim as my invention, and desire to secure by Letters Patent, is—

1. A rope-thimble in the form of a closed peripherally-grooved ring having pairs of clips projecting from its edges at opposite sides of a diametrical line to embrace the rope, and provided at the edges of its diametrically-opposite side with clips to embrace and protect the bend of the rope; substantially as described.

2. A rope-thimble formed from a blank having opposite side lips or ears at its middle, and similar lips near both ends; said blank being doubled longitudinally to form a channel or groove and then bent into the form of a ring with its ends contacting; said ears forming clips to embrace and protect the rope at its bend and thereabove; substantially as described.

Witness my hand this 29th day of April, A. D. 1899.

ROBERT A. HAMMOND.

In presence of—
P. E. TESCHEMACHER,
M. B. WILSON.